3,189,659
MESITYLENE RECOVERY
Arthur Newton, Trinidad, West Indies, assignor to Texaco Trinidad, Inc., Pointe-a-Pierre, Trinidad, West Indies, a corporation of Delaware
No Drawing. Filed May 16, 1962, Ser. No. 195,674
5 Claims. (Cl. 260—668)

This is a continuation-in-part of my co-assigned, co-pending application Serial No. 29,808, filed May 18, 1960, and now abandoned.

This invention relates to the recovery of mesitylene from hydrocarbon mixtures. Particularly, it pertains to the separation of 1,3,5-trimethylbenzene (mesitylene) from liquid $C_9$ aromatic hydrocarbon fractions. More particularly, it is directed to the production and recovery of 1,3,5-trimethyl benzene from liquid $C_9$ aromatic hydrocarbon fractions on a commercially practicable scale.

Mesitylene is useful as an octane appreciating additive in gasoline. In addition, it is useful as a reactant in the compounding of pharmaceutical preparations. Still further, it can be oxidized to trimesic acid.

By the term "$C_9$ aromatic hydrocarbon fraction," I intend a mixture of two or more aromatic hydrocarbon compounds, each having a total of nine carbon atoms, one of the compounds being mesitylene.

In the mesitylene art popular methods of separating mesitylene from other aromatic hydrocarbons are by fractionally distilling the mesitylene therefrom or by treating the aromatic hydrocarbon mixture with a hydrogen fluoride-boron trifluoride combination. Both methods of separation are tedious, require relatively costly equipment, and often produce mesitylene in low yields and purity. The distillation method, for example, necessitates extremely complex fractionating equipment since many of the aromatic ingredients in the $C_9$ hydrocarbon range have boiling points close to that of mesitylene. Further, fractional distillation can never successfully separate fractions of the same boiling point. As to the hydrogen fluoride-boron trifluoride separation, extremely careful adjustment of reactant ratios are necessary. Further, the hydrogen fluoride-boron trifluoride catalyst requires particular handling techniques and separation techniques.

Another prior procedure recovers mesitylene from $C_9$ fractions by selectively sulfonating the $C_9$ fraction utilizing a mole ratio of sulfonating acid to total $C_9$ fraction of less than about 1:1. However, this prior method requires at $C_9$ fraction of high mesitylene content, e.g., on the order of 70 to 80%, and also results in a final reaction product in which part of the mesitylene is contained in the unreacted sulfuric acid layer. Such a method has serious commercial drawbacks since to obtain a $C_9$ fraction having a mesitylene content of the order of 70–80% requires extensive and expensive fractionating equipment. Further, to recover mesitylene contained in the unreacted sulfonating acid medium is extremely difficult because of handling and the limitation on the number of recovery agents suitable for the separation.

In contrast to the above I have discovered a commercial method of separating mesitylene from a $C_9$ fraction of relatively low mesitylene content in which in the final reaction mixture the unreacted sulfonating acid is a separate layer. Broadly, the novel method comprises sulfonating a $C_9$ aromatic hydrocarbon fraction containing between about 25 and 40 wt. percent mesitylene to form the sulfonic acid derivatives of the $C_9$ aromatics, then reforming mesitylene by selectively hydrolyzing mesitylene sulfonic acid to mesitylene to the exclusion of the other $C_9$ aromatic and subsequently separating the resultant mesitylene product from the remaining $C_9$ sulfonic acids, e.g., by selective extraction. The sulfonating agent contemplated herein is sulfuric acid of between about 90 to 100 wt. percent strength. It is to be noted that when I speak of sulfuric acid concentrations of less than 100 wt. percent I am speaking of the aqueous solutions thereof.

Specifically, I have discovered that by contacting a $C_9$ aromatic hydrocarbon fraction, said fraction derived from a particularly formed hydroformed petroleum naphtha and containing between about 25 and 40 wt. percent mesitylene, with between about 90 and 100 wt. percent sulfuric acid in a mole ratio of $H_2SO_4$ to non-mesitylene $C_9$ aromatics of at least about 1.8:1, desirably between about 1.8:1 and 3.1:1 and a mole ratio of $H_2SO_4$ to total $C_9$ aromatic hydrocarbon of at least about 1.2:1, desirably between about 1.2:1 and 2.1:1, at a temperature between about 194 and 248° F. (90 and 120° C.), three separate and distinct layers are formed as the final reaction mixture. The top layer is a clear oil comprising mesitylene and saturated aliphatic and cycloaliphatic hydrocarbons (if any). The middle layer is composed of a solution of sulfonic acids of the remaining aromatic hydrocarbons and mesitylene and water. The bottom layer is unreacted sulfuric acid. The layers are then separated from one another by any standard means such as decantation.

If essentially quantitative yields of mesitylene are desired, removal by selective extraction of mesitylene residue in the above described sulfonic acid layer will be necessary. Further, if mesitylene of high purity is also desired the top mesitylene layer is desirably subjected to a selective extraction treatment.

The selective solvent employed must meet the requirements of being selective to mesitylene, completely miscible with mesitylene, undergo no chemical change with the constituents of the terminal sulfonation mixture and be readily separable from the mesitylene by distillation. Any solvent meeting these requirements would be suitable. Such a solvent could be any normally liquid saturated aliphatic hydrocarbon, chlorinated saturated aliphatic hydrocarbon, and mixtures thereof, boiling outside the range of about 300–365° F. (149–185° C.), preferably outside the range of about 220–400° F. (104–204° C.). Specific examples of the selective solvents contemplated herein are pentane, hexane, heptane, dodecane, 1,1,1-trichloroethane and 1,2-dichloropropane.

Alternatively the removal of the mesitylene from the sulfonic acid layer can be accomplished by stripping out mesitylene with inert gas such as natural gas at a temperature between about 200 and 250° F. (93–121° C.).

It is theorized that the separation of mesitylene from other constituents is accomplished by the sulfuric acid reacting with the alkyl substituents on the aromatic nuclei including the alkyl substitutents of mesitylene to form aromatic sulfonic acids and water. The thus formed water under the reaction conditions is able to hydrolyze the mesitylene sulfonic acid back into mesitylene but is not sufficient under said conditions to hydrolyze any of the other sulfonated aromatic hydrocarbons.

There are several essential features in my afore-described mesitylene procedure. The first feature is the use of a specific $C_9$ aromatic hydrocarbon fraction derived from hydroforming petroleum naphtha in a particular manner wherein the final mesitylene content in the $C_9$ is between about 25 and 40 wt. percent. With mesitylene concentrations below 25 wt. percent, the yield and purity of the finally recovered mesitylene is inferior. To obtain $C_9$ fraction with mesitylene concentrations above about 40 wt. percent is not commercially feasible due to the extensive fractionating required. Therefore, the source material contemplated is commercially produceable and in an economical manner permits the recovery of mesitylene therefrom in high yield and of good purity.

The mesitylene containing $C_9$ aromatic fraction contemplated herein is obtained by treating a mixture of hydrogen and petroleum naphtha having a boiling point range within about 150–500° F. (66–260° C.) over any conventional hydroforming catalyst such as alumina impregnated with 0.1–3 wt. percent platinum and 0.1–3 wt. percent halogen or activated alumina impregnated with 4–10 wt. percent molybdenum oxide. The catalyst promotes an increase in the aromatic content of the naphtha and also the evolution of hydrogen. During the aromatization operation the naphtha-hydrogen feed is passed through any convenient catalytic reactor, e.g., a fixed bed or a fluidized bed reactor at an elevated temperature and pressure, e.g., 500–1000° F. (260–538° C.) and 50–1500 p.s.i.g., at a space velocity between about 0.1–10 volumes of naphtha per volume of catalyst per hour and at a ratio of hydrogen to naphtha in the initial feed of between 1000 and 10,000 standard cubic feet per barrel of naphtha. After passing the feed through the catalytic reactor, the temperature of the aromatized naphtha is reduced, e.g., to between about 200–300° F. (93–149° C.) by convenient heat exchange apparatus. The hydrogen introduced and produced during the hydroforming operation is normally recycled to the initial naphtha entering the catalytic reforming reactor. The hydroformed naphtha can be fractionated by any standard means to obtain a $C_9$ aromatic fraction having an initial and final boiling point within the temperature range of between about 300–350° F. (149–177° C.). One means of accomplishing this fractionation is by selectively extracting the aromatic hydrocarbons from the above described hydroformed naphtha utilizing a selective solvent. The extraction is normally performed by passing the cool hydroformed naphtha in countercurrent flow to a selective solvent for aromatic hydrocarbons, e.g., furfural, ethyleneglycol, diethylene glycol, propylene glycol, mixtures of glycols and aqueous mixtures thereof. The resultant raffinate and extract solution are withdrawn from opposite ends of the extraction tower. Raffinate is composed of aliphatic and cycloaliphatic hydrocarbons and can be recycled to the initial naphtha feed prior to the latter's introduction into the catalytic hydroforming reactive.

The aromatic-containing extract solution can be fractionally distilled with the $C_9$ aromatic hydrocarbon cut being collected between the range of 300 to 350° F. (149–177° C.). Desirably, the $C_9$ fraction is further fractionated in a temperature range between 320 to 334° F. (160 to 168° C.) to recover a $C_9$ fraction containing between about 25 and 40 wt. percent mesitylene. The recovered $C_9$ fraction in addition to mesitylene contains one or more nine carbon atom aromatic materials such as 1,2,4-trimethylbenzene, 1,2,3-trimethylbenzene, propylbenzene, isopropylbenzene, o-ethyltoluene, p-ethyltoluene and m-ethyltoluene. In addition, the $C_9$ fraction may contain some saturated aliphatic impurities having boiling points equivalent to the $C_9$ aromatics. Since the saturated aliphatics are not completely separated from the mesitylene in my process, it is desirable that they be removed during the aforementioned hydroforming and fractionation if an essentially pure mesitlyene product is desired.

It is to be noted that a straight run naphtha which was not subject to the above described hydroforming treatment was found to produce a $C_9$ fraction containing less than 10 wt. percent mesitylene which is of course unsuitable for any significant recovery of mesitylene from a yield and purity standpoint.

A second essential limitation of the invention is the maintenance of the mole ratio of sulfuric acid to non-mesitylene hydrocarbons to at least about 1.8:1, desirably between about 1.8:1 and 3.1:1 and the mole ratio of sulfuric acid to total $C_9$ hydrocarbons at least about 1.2:1, desirably between about 1.2:1 and 2.1:1. Mole ratios below 1.8:1 $H_2SO_4$/non-mesitylene $C_9$ hydrocarbon and 1.2:1 $H_2SO_4$/total $C_9$ hydrocarbon give recovered mesitylene fractions of substantially reduced purity. Further, mole ratios of above 3.1:1 $H_2SO_4$/non-mesitylene $C_9$ hycarbons and 2.1:1 $H_2SO_4$/total hydrocarbon render such an excess of unreacted $H_2SO_4$ in respect to any gain in purity as to cause unwarranted acid handling problems.

A third essential feature of my novel process is the maintenance of the sulfonation temperature between about 90 and 120° C. When sulfonation is conducted at temperatures above 120° C. the contamination of the mesitylene with m-ethyl toluene and pseudocumene is significant. At temperatures below 90° C. p-ethyltoluene becomes a significant impurity.

The sulfuric acid concentration is desirably maintained between about 90 and 100 wt. percent strength since the lower the acid strength generally the higher the mesitylene yield but the lower the purity. Therefore, the 90 to 100 wt. percent value is a compromise between purity and yield.

In addition to the foregoing, the particular combinationation of conditions called for in the sulfonation step of the process produces a three phase final reaction product: a top mesitylene phase, a middle sulfonic acid phase and a bottom unreacted sulfuric acid phase. The advantage of a three phase final product is the unreacted sulfuric acid as found in a separate phase which simplifies the separation of the sulfonic acid and mesitylene from the reaction mixture. The presence of sulfuric acid in the mesitylene and sulfonic acid phases because of its corrosiveness and reactivity to materials complicates the mesitylene and sulfonic acid separation from said phases.

The following examples further illustrate my invention.

*Example I*

This example illustrates the overall process of the invention.

The $C_9$ aromatic hydrocarbon employed in this example is derived by passing a feed comprising hydrogen and a petroleum straight run naphtha of a boiling range of 190 to 370° F. (88–188° C.) in a ratio of 8000 standard cubic feet of hydrogen per barrel of naphtha over a platinum catalyst at a temperature of 940° F. (504° C.), a pressure of about 500 p.s.i.g., at a feed rate of three volumes of naphtha per volume of catalyst per hour and subsequently extracting the aromatized liquid product under pressure at 350° F. (177° C.) with diethylene glycol. The extract solution was fractionated and the fraction boiling between 320 and 334° F. (160–168° C.) was recovered. This $C_9$ aromatic fraction was analyzed and found to be of the following composition:

| Components: | Wt. percent |
|---|---|
| Mesitylene | 31 |
| o-Ethyltoluene | 28 |
| n-Ethyltoluene | 23 |
| Pseudocumene | 17 |
| Isopropylbenzene | 1 |

To 300 grams (2.5 moles) of the above $C_9$ fraction 300 grams of 98 wt. percent surfuric acid (3.0 moles) were added. This is equivalent to 1.2 moles sulfuric acid per mole of total $C_9$ fraction or 1.8 moles sulfuric acid per mole of non-mesitylenes in the $C_9$ fraction. It is to be noted that the calculation is on a 100% wt. sulfuric acid basis. The resultant mixture was agitated for a period of 2 hours at 110° C. At the end of this period agitation was ceased and the resultant mixture was allowed to stand.

Upon standing, three separate distinct layers were formed and were separated from one another by decantation. The top layer weighed 65 grams and was found to be mesitylene. The intermediate layer weighing 480.5 grams was found to comprise the solution of aromatic sulfonic acid, mesitylene and water. The bottom layer weighing 48 grams was unreacted sulfuric acid.

It is to be noted that 28 grams of mesitylene remained in the sulfonic acid middle layer. These 28 grams were recovered by mixing the middle layer with 150 grams of pentane at 80° F. (27° C.). The pentane extract solution was separated from the residual sulfuric acids by decantation subjected to fractional distillation with the pentane being removed as overhead and the mesitylene remaining as residue. This mesitylene residue was combined with the separated top mesitylene layer thereby rendering a quantitative (100%) yield of mesitylene of 93 grams.

*Example II*

This example illustrates the importance of maintaining the mole ratio of sulfuric acid to non-mesitylene and total hydrocarbons within the prescribed range.

600 grams of a hydroformed $C_9$ fraction was sulfonated with 95.6 wt. percent sulfuric acid at 110° C. for a period of 4 hours. At the end of the sulfonation period there were three layers, the top essentially mesitylene layer, the middle sulfonic layer and the bottom sulfuric acid layer. The sulfonic and mesitylene layers were separated from the sulfuric acid layer and the sulfonic and mesitylene layers were treated with pentane as described in Example I. The $C_9$ fraction employed contained 29 wt. percent mesitylene. This procedure was repeated utilizing different ratios of sulfuric acid to hydrocarbon. The data found below compares the purity of the recovered mesitylene fraction and the mole ratio of the sulfuric acid to non-mesitylene and total hydrocarbons in the sulfonation stage.

| Description | Run A | Run B | Run C | Run D | Run E | Run F | Run G | Run H |
|---|---|---|---|---|---|---|---|---|
| Mole ratio, $H_2SO_4$/non-mesitylene $C_9$ aromatics | 1.4 | 1.6 | 1.8 | 2.0 | 2.1 | 2.2 | 2.4 | 2.6 |
| Mole ratio, $H_2SO_4$/total hydrocarbon | 0.99 | 1.13 | 1.27 | 1.42 | 1.56 | 1.58 | 1.70 | 1.85 |
| Purity mesitylene, wt. percent | 70.2 | 73.9 | 82.0 | 85.8 | 89.8 | 89.4 | 90 | 89.2 |

*Example III*

This example illustrates the desirability of maintaining the mesitylene content in the $C_9$ fraction above about 25 wt. percent.

A hydroformed $C_9$ aromatic fraction containing 22 wt. percent mesitylene was sulfonated at 110° C. for 4 hours using 95.6 wt. percent sulfuric acid. The mole ratio of acid to non-mesitylene employed was 2.1:1 and the mole ratio of sulfuric acid to total hydrocarbon is 1.6:1. Both the top mesitylene layer, the final reaction mixture and the middle sulfonic layer were treated with pentane and following the distillation of the pentane it was found the mesitylene recovery was 66 wt. percent. Under the same conditions utilizing a 29 wt. percent mesitylene containing $C_9$ fraction the mesitylene recovery was between 84 and 89 wt. percent.

*Example IV*

This example illustrates the effect of the sulfonation temperature on the yield of mesitylene.

300 grams of hydroformed $C_9$ fraction was sulfonated with 500 grams of 95.4 wt. percent sulfuric acid (equivalent to a mole ratio of $H_2SO_4$/non-mesitylene $C_9$ aromatics of 2.9) for a period of 12 hours. The procedure was repeated at different temperatures. The results were as follows:

| Run No. | Temperature, °C. | Mesitylene, wt. percent |
|---|---|---|
| Run A | 120 | 98.5 |
| Run B | 110 | 98.5 |
| Run C | 95 | 98.5 |
| Run D | 40 | 77 |
| Run E | 150 | 85 |

As can be seen from the above the yield of mesitylene sharply reduces when sulfonation is conducted substantially outside the contemplated 90 to 120° C. range.

I claim:
1. The method of obtaining high purity mesitylene in good yields from a petroleum naphtha which comprises:
    (1) passing a mixture of hydrogen and petroleum naphtha having a boiling point between about 66–260° C. over a hydroforming catalyst, at a temperature between about 260 and 538° C., at a pressure between 50 and 1500 p.s.i.g., a space velocity between about 0.1 and 10 volumes of naphtha per volume of said catalyst per hour, and a ratio of hydrogen to naphtha between about 1000 and 10,000 standard cubic feet per barrel of naphtha,
    (2) fractionating the resultant hydroformed naphtha to separate a $C_9$ aromatic fraction having initial and final boiling points within the temperature range of between about 149 and 177° C. and a mesitylene content between about 25 and 40 wt. percent,
    (3) agitating said separated $C_9$ fraction with sulfuric acid of an acid strength between about 90 and 100 wt. percent in a mole ratio of $H_2SO_4$ to non-mesitylene hydrocarbons in said separated $C_9$ fraction of at least about 1.8:1 and in a mole ratio of $H_2SO_4$ to said separated $C_9$ fraction of at least about 1.2:1, at a temperature between about 90 and 120° C. for a period of time effective to sulfonate aromatic hydrocarbons and to hydrolyze mesitylene sulfonic acid to mesitylene,
    (4) allowing the reaction mixture to stratify into a top mesitylene layer of high purity, a middle mesitylene layer of a solution of aromaitc sulfonic acids, water and mesitylene and a bottom layer of sulfuric acid, and
    (5) separating said layers and recovering mesitylene from said top mesitylene layer and middle sulfonic acid layer.

2. A method according to claim 1 wherein step (3) said $H_2SO_4$ to non-mesitylene ratio is between about 1.8:1 and 3.1:1 and said $H_2SO_4$ to said $C_9$ fraction is between about 1.2:1 and 2.1:1.

3. A method in accordance with claim 1 wherein the mesitylene is recovered from the stratified reaction mixture of step (4) by treating said top and middle layers with a normally liquid saturated selective solvent for mesitylene selected from the group consisting of aliphatic hydrocarbons, chlorinated aliphatic hydrocarbons and mixtures thereof, boiling outside the range of about 149 and 185° C.

4. A method in accordance with claim 1 wherein the separated $C_9$ aromatic fraction of step (2) boils within the range of 160–168° C.

5. The method according to claim 3 wherein said selective solvent is pentane.

References Cited by the Examiner

UNITED STATES PATENTS

| | | | |
|---|---|---|---|
| 2,232,761 | 2/41 | Balthis | 260—674 |
| 2,541,959 | 2/51 | Elwell | 260—674 |
| 2,774,800 | 12/56 | Schmidl et al. | 260—674 |
| 2,781,324 | 2/57 | Haensel | 260—668 |
| 2,873,300 | 2/59 | Corson et al. | 260—674 |
| 2,880,253 | 3/59 | Jezl et al. | 260—674 |

ALPHONSO D. SULLIVAN, *Primary Examiner.*